United States Patent [19]

Sachs

[11] 4,014,504
[45] Mar. 29, 1977

[54] CABLE HOOKING DEVICE

[76] Inventor: Isaac Sachs, 2065 Chartier Ave., Dorval, Quebec, Canada, H9P 1H3

[22] Filed: Feb. 2, 1976

[21] Appl. No.: 654,577

[52] U.S. Cl. .................................. 248/61; 174/43; 24/135 R
[51] Int. Cl.² ...................................... E21F 17/02
[58] Field of Search .......... 248/58, 61, 69; 174/41, 174/43, 44; 24/135 R, 135 K, 115 P; 339/246, 266 G, 266 L

[56] References Cited

UNITED STATES PATENTS

| | | | |
|---|---|---|---|
| 1,365,632 | 1/1921 | Pleister | 248/69 |
| 1,702,124 | 2/1929 | Matthes | 248/61 |
| 1,981,796 | 11/1934 | Bissell | 339/266 G |
| 3,141,643 | 7/1961 | Shrewsbury | 174/41 |
| 3,177,542 | 4/1965 | James | 248/61 |

OTHER PUBLICATIONS

Electric World, S & C Electric Co., 3-3-58, pp. 339-246.

*Primary Examiner*—Robert A. Hafer

[57] ABSTRACT

A hooking device for holding a cable from a suspended wire. The cable hooking device includes a pair of plates each having opposed end and lateral edges, which plates are bent outwardly on a same side at the end edges thereof and are disposed one over the other with respective end edges facing one another. Jaw means are provided on each plate at one end edge thereof, cooperating with one another to clamp the wire therebetween. The device further comprises releasable coupling means operable to bias the plates towards one another to secure the wire in clamping engagement between the plate jaw means, and at least one hooking member for holding the cable. The coupling means includes a bolt having a longitudinal axis extending perpendicularly of the plates between their opposed end edges. The hooking member has a connecting end, a stem portion and a hooking end, and its connecting end is mounted on the bolt with the stem portion extending generally perpendicularly thereto and out of the coupled plates through one of the remaining paired end and lateral edges thereof.

20 Claims, 7 Drawing Figures

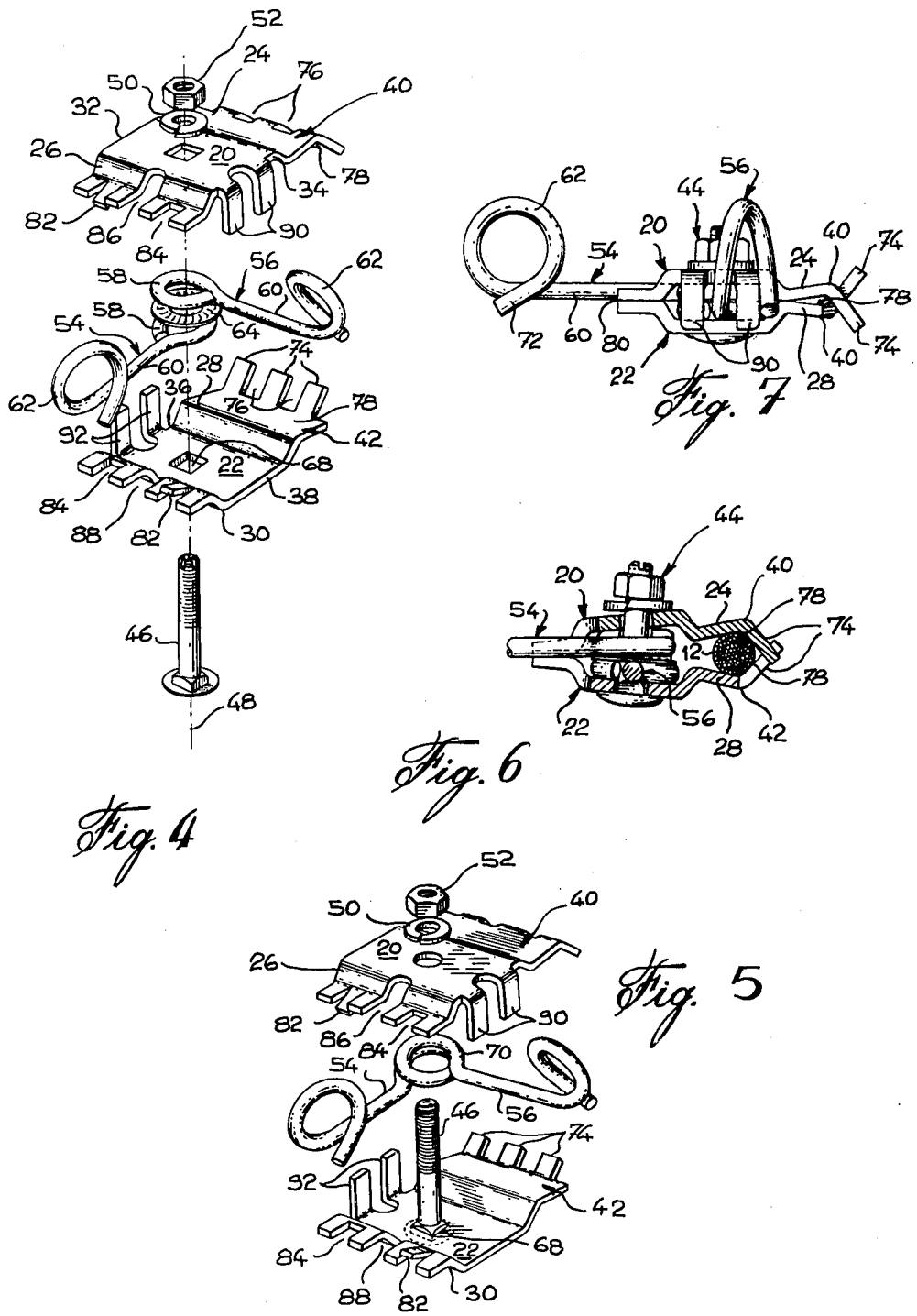

CABLE HOOKING DEVICE

The present invention is directed towards improvements in cable hooking devices. More particularly, the invention is concerned with an improved hooking device for holding a cable from a suspended wire.

When it is desired to secure a cable to a suspended wire, for instance, a guy wire running between posts, one is faced with the problem that the connection to be made must not intervene with adjacent cables usually supported by the guy wire. A type of hooking device conventionally employed to this end comprises a pair of clamping plates and a bolt and nut cooperating to bias these towards one another in order to tightly secure the guy wire mounted therebetween. The bolt which extends perpendicularly of the plates terminates, at its other end, in the form of a hook of holding the cable. As a result of this structure, the pull of the hook is off-set from the axis of the guy wire and, upon a heavy cable load, will cause local twisting of the guy wire, if the device is so tightly clamped thereto, with the device following of course, or else the latter will simply rotate about the guy wire. In such an instance, the threaded end of the bolt and sharp corners of the nut may interfere with the aforesaid adjacent cables and even damage these.

It is an object of the present invention to provide an improved hooking device for holding a cable from a suspended wire, with which the above disadvantage is circumvented.

It is a further object of the invention to provide a cable hooking device which, when installed, lies with the suspended wire in generally a same plane.

It is another object of the invention to provide a cable hooking device which can carry more than one hooking member and thus more uniformly divide the tension upon the suspended wire.

It is yet another object of the invention to provide a cable hooking device which is simple both in structure and construction and is easy to install.

In accordance with the present invention, there is thus provided a hooking device for holding a cable from a suspended wire. The hooking device of the invention includes a pair of plates each having opposed end and lateral edges, which plates are bent outwardly on a same side at the end edges thereof and are disposed one over the other with respective end edges facing one another. Jaw means are provided on each plate at one end edge thereof, cooperating with one another to clamp the wire therebetween. The device further comprises releasable coupling means operable to bias the plates towards one another to secure the wire in clamping engagement between the plate jaw means, and at least one hooking member for holding the cable. The coupling means includes a bolt having a longitudinal axis extending perpendicularly of the plates between their opposed end edges. The hooking member has a connecting end, a stem portion and a hooking end, and its connecting end is mounted on the bolt with the stem portion extending generally perpendicularly thereto and out of the coupled plates through one of the remaining paired end and lateral edges thereof.

In a preferred embodiment of the invention, the jaw means include a plurality of teeth spaced along the said one end edge of each plate, the teeth of one plate being insertable in corresponding spaces between teeth of the other plate. The toothed jaw means cooperate to surround the suspended wire when the latter is clamped therebetween and thereby prevent accidental disconnecting of the device from the wire as a result of a loosening of the coupling means which might occur through time.

According to a further preferred embodiment, first guide means are provided on the plates cooperating to prevent lateral displacement of the plates relative to one another. Such guide means can include a projection on one of the plates at its other end edge and a corresponding opening formed in the other plate at its other end edge, the guiding projection being inserted in the said corresponding opening.

In accordance with another preferred embodiment, second guide means are also provided for guidingly receiving the hooking member extending out of the coupled plates. Where the hooking member extends out, for instance, through the other end edges of the plates, such guide means can include aligned openings formed in the plates at their other end edges for guidingly receiving therethrough the stem portion of the hooking member. In the case where the hooking member extends out through lateral edges of the plates, such guide means can include projecting spaced fingers extending generally perpendicularly of one of the plates at one of its lateral edges, these fingers guidingly receiving therebetween the stem portion of the hooking member.

Preferred embodiments of the subject invention will now be described in greater detail, with reference to the apended drawings, wherein:

FIG. 4 is an exploded view of the above cable hooking device;

FIG. 5 is a view similar to that of FIG. 4 but showing a different type of hooking member;

FIG. 6 is a section view taken along lines 6—6 of FIG. 3; and

FIG. 7 is a side view of the cable hooking device.

Figure 1:
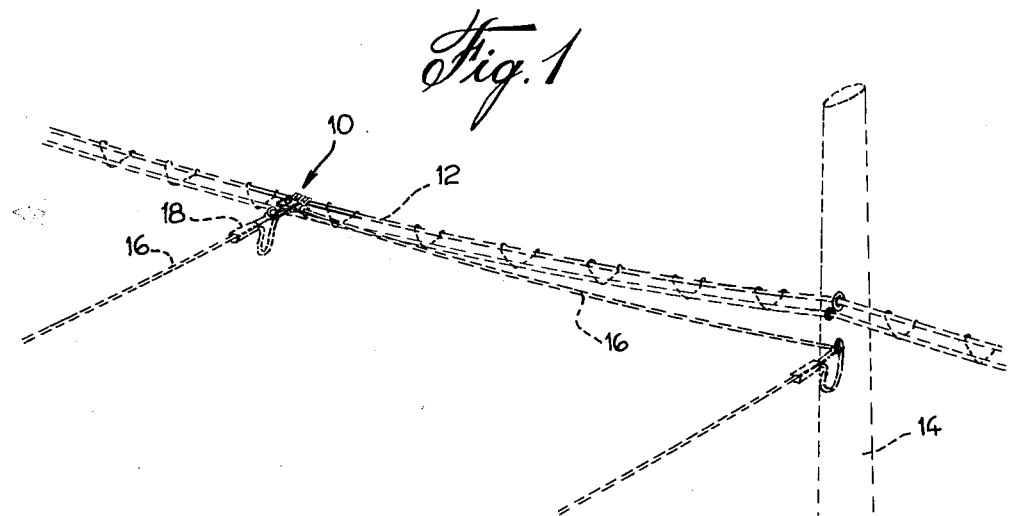
FIG. 1 is a general perspective view showing a hooking device according to the invention installed on a guy wire and holding therefrom a cable by means of conventional cable wedge clamps.

Referring first to FIG. 1, the cable hooking device 10 is seen installed on a guy wire 12 running between posts 14 (only one illustrated), the guy wire and post being represented in dotted lines. The device holds a cable 16 by means of a wedge clamp 18 of the type described in the applicant's U.S. Pat. No. 3,960,461, issued June 1, 1976; the cable and cable wedge clamp are also represented in dotted lines. Such wire network is most convenient when it is desired to connect a cable, such as a TV cable, from a house directly to a nearby guy wire running between posts on a street where such posts are too far spaced from each other and it is impossible to secure the cable to the post without a major portion of the suspended wire sagging to an undesirable extent.

Figure 2:
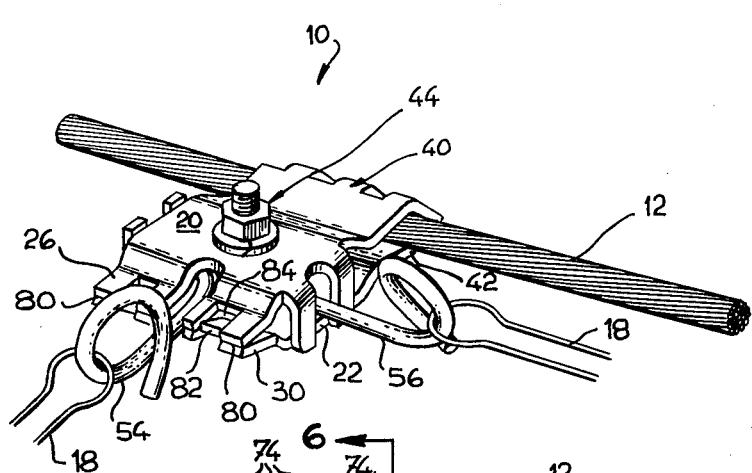
FIG. 2 is a perspective view of the above cable hooking device seen in clamping engagement with the guy wire, with only part of the cable wedge clamps being shown.
Figure 3:
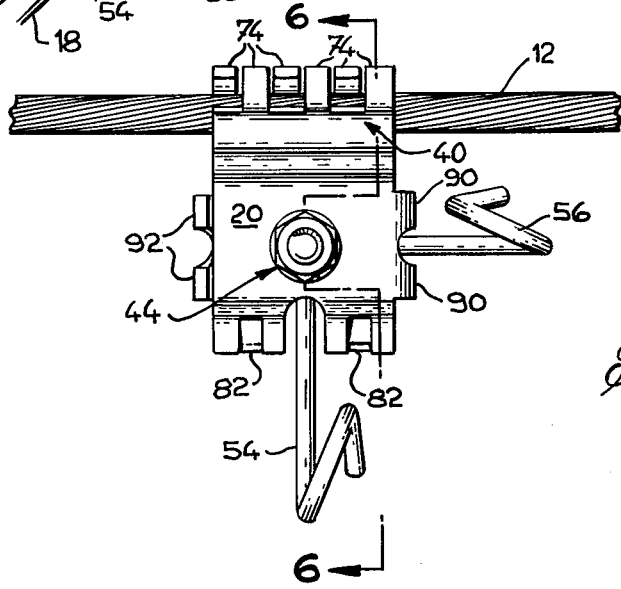
FIG. 3 is a top view of the above cable hooking device seen in clamping engagement with the guy wire.

Turning now to FIGS. 2 and 3, and more particularly to FIG. 4, the cable hooking device 10 includes a pair of plates 20 and 22 each having opposed end edges 24,26 and 28,30, respectively, as well as opposed lateral edges 32,34 and 36,38, respectively. Plates 20 and 22 are bent outwardly on a same side at their end edges 24,26 and 28,30, and are disposed one over the other with their respective end edges facing each other. Jaw means 40 and 42 are provided on the plates at end edges 24 and 28, respectively, cooperating with one another to clamp the wire 12 therebetween. The device further comprises releasable coupling means 44 operable to bias the plates 20 and 22 towards one another to secure the wire 12 in clamping engagement between the plate jaw means 40 and 42. Coupling means 44 includes a bolt 46 having a longitudinal axis 48 extending perpendicularly of plates 20 and 22 between their opposed end edges 24,26 and 28, 30, respectively. A lock-washer 50 interposed between the bolt 46 and nut 52 serves here to securely retain the plates together.

In the embodiment illustrated, two hooking members 54 and 56 are provided for holding the cable. Both hooking members are identically shaped and each has a connecting end 58, a stem portion 60 and a hooking end 62. The connecting end of each hooking member is mounted on bolt 46, with the corresponding stem portion generally perpendicularly thereto. The stem portion 60 of hooking member 54 extends out of the coupled plates 20,22 through paired end edges 26,30, whereas the stem portion of the second hooking member 56 extends out through paired lateral edges 34,38. It is apparent that both hooking members 54 and 56 are perpendicular to one another, one hooking member 54 extending perpendicularly to the guy wire 12 and the other member 56 parallely thereto; such arrangement will be suitable for hooking a cable from a house or like structure to a facing guy wire and, from thereon, to a nearby post located on the right hand side of the hook-up, as illustrated in FIG. 1. Although not represented, the second hooking member 56 could also extend out of the coupled plates through the other lateral edges 32,36 and, in this case, would serve for a connection of the cable with a post located at the left hand side of the hook-up. A further arrangement where both hooking members 54 and 56 would extend generally in alignment with one another and out of the coupled plates 20,22 through paired lateral edges 32,36 and 34,38, respectively, is of course also contemplated; in such an instance, both hooking members being parallel to the guy wire would serve to hold a cable running therealong.

A washer-like member 64 is mounted in tight-fit engagement on bolt 46 for fixedly holding in cooperation therewith the connecting end 58 of hooking member 54 against plate 22. This feature permits when dismantling the device to easily rotate the second hooking member 56 about the bolt 46 so as to extend from one given direction into the opposite, without loosing the bolt through accidental withdrawal of the same from the aperture 68 formed in plate 22. Another embodiment resides in the provision of a different type of hooking member, such as represented in FIG. 5. In this embodiment, both hooking members 54 and 56 are integral with one another and have a common connecting end 70 mounted on bolt 46 which is here inserted in tight-fit engagement into aperture 68. Both hooking members are rotatable together at their common connecting end about the bolt 46.

The hooking end 62 of each hooking member is an extension of the stem portion 60 thereof which forms a complete circle with an end portion 72 spaced from the stem portion (FIG. 7). As it is apparent from FIG. 2, such configuration permits an easy and quick mounting of a cable wedge clamp 18 onto the hooking member.

As noted above, jaw means 40 and 42 are provided on the plates at end edges 24 and 28, respectively, cooperating with one another to clamp the suspended wire 12 therebetween. These include a plurality of teeth 74 spaced along the aforesaid end edge of each plate, the teeth of one plate being insertable in corresponding spaces 76 between the teeth of the other plate. The toothed jaws means thus cooperate to surround the wire 12 when the latter is clamped therebetween, as best shown in FIG. 6. The bent end edges 24 and 28 of the plates together with the jaw means thereof each form a channel 78 for sittingly receiving the wire. In addition, the other bent end edges 26 and 30 of plates 20 and 22, respectively, abut one over the other whereby to act as a hinge 80 allowing ajustable clamping of the wire between the plate jaw means 40 and 42 by operation of the coupling means 44 (FIGS. 2 and 7). In FIG. 7, the device is seen with the toothed jaw means in closed position, no wire being inserted therebetween.

Guide means are also provided on the plates cooperating to prevent lateral displacement of the plates relative to one another. These include a projection 82 on plate 22 at its end edge 30 and a corresponding opening 84 formed in the other plate 20 at its end edge 26. The guiding projection 82 is inserted in opening 84, as best shown in FIG. 2. In the embodiment illustrated, plate 20 is also formed with a guiding projection 82 and plate 22 with a corresponding opening 84, so that corresponding guiding projections and openings of the plates are inserted in one another.

With particular reference to FIG. 4, the hooking device is shown including further guide means on the plates for guidingly receiving the hooking members 54 and 56 extending out of the coupled plates 20 and 22. Such further guide means include aligned openings 86 and 88 formed respectively in plates 20 and 22 at their end edges 26 and 30, for guidingly receiving therethrough the stem portion 60 of hooking member 54. Projecting spaced fingers 90 extending generally perpendicularly of plate 20 at its lateral edge 34 are also provided for guidingly receiving therethrough the stem portion 60 of the second hooking member 56. Similar projecting spaced fingers 92 on plate 22 at its lateral edge 36 serve for guidingly receiving hooking member 56 in the case where the latter would extend out of the coupled plates 20 and 22 through lateral edges 32,36 instead of lateral edges 34,38.

Both plates 20 and 22 are identically shaped plates and, therefore, the manufacturing costs of the cable hooking device are relatively low. The plates, hooking members as well as the coupling means are advantageously made of aluminum, although other rust-proof metals or alloys are also contemplated.

I claim:

1. A hooking device for holding a cable from a suspended wire comprising:
   a. a pair of substantially identical plates opposingly disposed, each plate comprising:
      first and second end edges,
      first and second lateral edges,
      said first end edge being bent to provide a jaw means for gripping said suspended wire and having teeth asymmetrically formed therein,
      said second end edge being bent to provide a hinging means and having:

1. first receiving means comprising a notch centrally located therealong,
2. guide means comprising:
   i. a projection along one portion,
   ii. a second notch at a second portion thereof, and
   said first lateral edge having second receiving means comprising spaced fingers projecting therefrom;
b. releasable coupling means operable to bias said plates toward one another for securing said wire between said jaw means, and
c. at least one hooking member for holding said cable;
   whereby said asymmetrically formed teeth of said first end edges of two opposingly disposed plates interdigitate, said projection along said one portion of a second end edge of one plate is inserted in said second notch at said second portion of a second end edge of a second plate thereby preventing relative lateral movement of the plates, and said central notches of the two plates together from the first receiving means and said fingers form the second receiving means, adapted to receive a hooking member perpendicular to and parallel to said wire, respectively.

2. A hooking device for holding a cable from a suspended wire, comprising
   a pair of plates each having opposed end and lateral edges, said plates each in corresponding direction at both being bent outwardly end edges thereof, said plates disposed one over the other with respective end edges paired and facing one another,
   jaw means on each plate at one end edge thereof, cooperating with one another to clamp said wire therebetween,
   releasable coupling means operable to bias said plates towards one another to secure said wire in clamping engagement between said plate jaw means, said coupling means including a bolt having a longitudinal axis extending perpendicularly of said plates between said opposed end edges, and
   at least one hooking member for holding said cable, said member having a connecting end, a stem portion and a hooking end, said connecting end being mounted between said plates and on said bolt with said stem portion extending generally perpendicularly to said bolt and out of said coupled plates through one of the remaining paired end and lateral edges thereof, said remaining paired end and lateral edges each defining a guide means for orienting and maintaining said one hooking member substantially perpendicularly or parallely to the suspended wire, respectively.

3. The hooking device of claim 2, wherein said one bent end edge of each plate together with said jaw means thereof form a channel for sittingly receiving said wire when said wire is clamped between said plate jaw means.

4. The hooking device of claim 3, wherein said jaw means include a plurality of teeth spaced along said one end edge of each plate, the teeth of one plate being insertable in corresponding spaces between teeth of the other plate, the toothed jaw means cooperating to surround said wire when said wire is clamped therebetween.

5. The hooking device of claim 4, wherein the other end edges of said plates abut one over the other whereby to act as a hinge allowing adjustable clamping of said wire between said plate jaw means by operation of said coupling means.

6. The hooking device of claim 5, including means on said plates for cooperating to prevent lateral displacement of the plates relative to one another.

7. The hooking device of claim 6, wherein said lateral displacement preventing means include a projection on one of said plates at its other end edge and a corresponding opening formed in the other plate at its other end edge, said guiding projection being inserted in said corresponding opening.

8. The hooking device of claim 7, wherein each plate is formed at said other end edge thereof with said projection and said opening spaced therefrom, whereby corresponding projections and openings of said plates are inserted in one another.

9. The hooking device of claim 6, wherein said one hooking member extends out of said coupled plates through said other end edges thereof.

10. The hooking device of claim 9, wherein said paired end guide means include aligned openings formed in said plates at said other end edges thereof for guidingly receiving therethrough the stem portion of said one hooking member.

11. The hooking device of claim 10, including a further hooking member extending out of said coupled plates through one of their lateral edges, generally perpendicularly to said one hooking member.

12. The hooking device of claim 11, wherein said lateral edges guide means include projecting spaced fingers extending generally perpendicularly of one of said plates at said one lateral edge thereof, said fingers guidingly receiving therebetween the stem portion of said further hooking member.

13. The hooking device of claim 6, wherein said one hooking member extends out of said coupled plates through one of their lateral edges.

14. The hooking device of claim 13, wherein said lateral edges guide means include projecting spaced fingers extending generally perpendicularly of one of said plates at said one lateral edge thereof, said fingers guidingly receiving therebetween the stem portion of said one hooking member.

15. The hooking device of claim 14, including a further hooking member extending out of said coupled plates through the other lateral edges thereof, generally in alignment with said one hooking member.

16. The hooking device of claim 15, wherein said lateral edges guide means include further projection spaced fingers extending generally perpendicularly of one of said plates at said other lateral edge thereof, said further fingers guidingly receiving therebetween the stem portion of said further hooking member.

17. The hooking device of claim 1, wherein the hooking end of said one hooking member is an extension of the stem portion thereof forming a complete circle with an end portion spaced from said stem portion.

18. The hooking device of claim 11, wherein said one and further hooking members are integral with one another and have a common connecting end mounted on said bolt.

19. The hooking device of claim 11, wherein a washerlike member is mounted on said bolt for fixedly holding in cooperation therewith the connecting end of one of said hooking members against one of said plates.

20. The hooking device of claim 1, wherein said plates are identically shaped.

* * * * *